3,078,643
SEPARATION OF AROMATIC FROM SATURATED HYDROCARBONS
Robert M. Milton, Buffalo, N.Y., assignor to Union Carbide Corporation, a corporation of New York
Filed Jan. 6, 1960, Ser. No. 815
2 Claims. (Cl. 55—75)

This invention relates to a method for adsorbing fluids and separating a mixture of fluids into its component parts. More particularly, the invention relates to a method of separating toluene from a vapor mixture thereof with normal hexane.

This application is a continuation-in-part of copending patent application Serial No. 400,386, filed December 24, 1953, now abandoned.

Illustrating the utility of this invention, toluene-normal hexane mixtures often result as distillation fractions after catalytic cracking, or reforming reactions in petrochemical operations. It would be desirable to separate and isolate the aromatic compound from the aliphatic compound with which it is commonly associated. The process of the present invention makes possible such a separation.

Broadly, the invention comprises mixing molecules, in a fluid state, of the materials to be adsorbed or separated, with a crystalline, synthetic, dehydrated zeolite X, and effecting the adsorption of the adsorbate by the zeolite.

Zeolite X, and the methods for making zeolite X, are described in detail, and claimed, in U.S. patent application Serial No. 400,389, filed December 24, 1953, now U.S. Patent No. 2,882,244, issued April 14, 1959 in the name of R. M. Milton.

It is the principal object of the present invention to provide a process for the selective adsorption of molecules from fluids. A further object of the invention is to provide a method whereby toluene may be adsorbed and separated by crystalline synthetic zeolite X from fluid mixtures with normal hexane.

Figure 1:
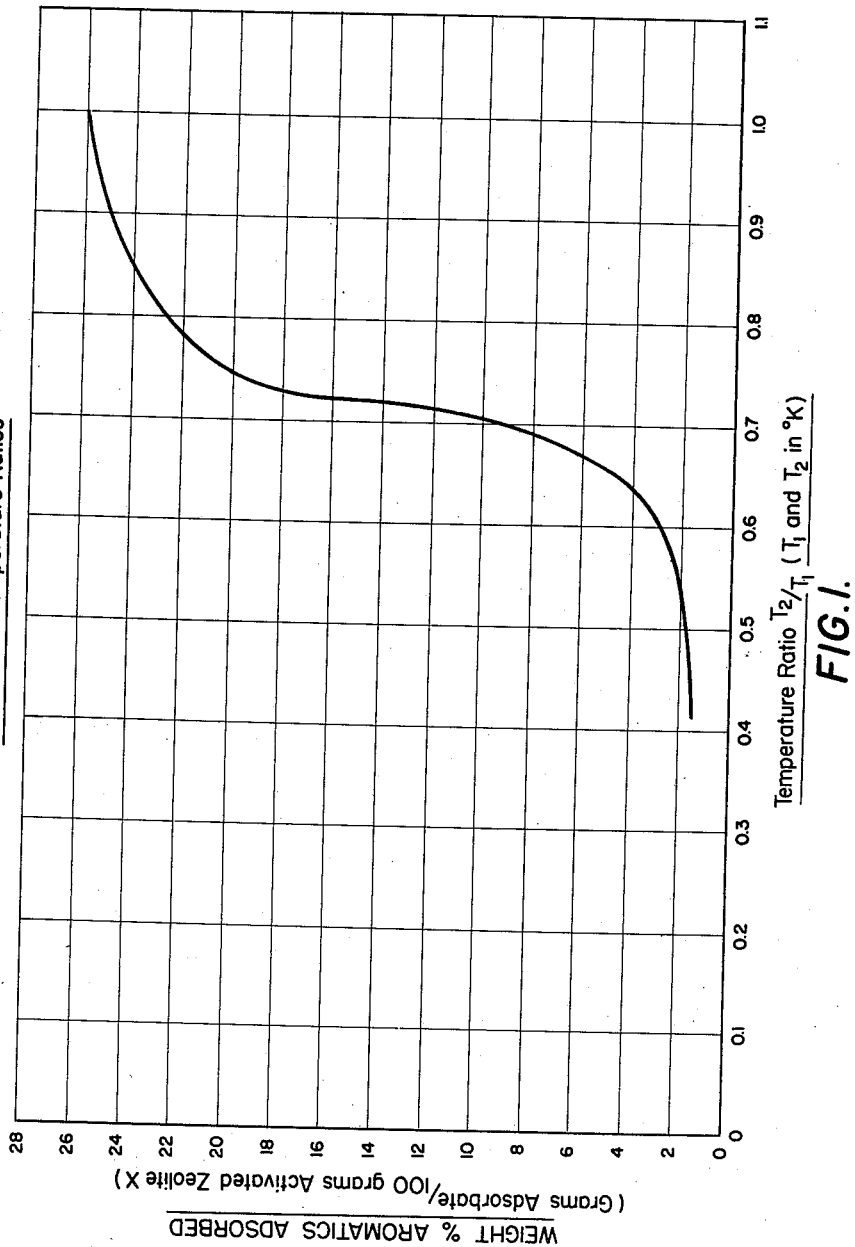
FIG. 1 is a graph showing the amount of aromatic compounds adsorbed versus the temperature ratio $T_2/T_1$ for zeolite X.

The formula for zeolite X may be written as follows:

$$0.9 \pm 0.2 M_{\frac{2}{n}}O : Al_2O_3 : 2.5 \pm 0.5 SiO_2 : YH_2O$$

In this formula "M" represents a metal, "$n$" its valence, and "Y" may be any value up to 8 depending on the identity of the metal and the degree of hydration of the crystal. X-ray diffraction data may be employed to define the crystal structure of zeolite X. Such information and processes for synthesizing zeolite X, are found in U.S. Patent No. 2,882,244.

The adsorbents contemplated herein include not only the sodium form of zeolite X, which is a common form produced, but also crystalline materials obtained from such a zeolite by partial or complete replacement of the sodium ion with other cations. Sodium cations can be replaced, at least in part, by other ions. For example, this may be accomplished by ion exchange techniques.

The zeolites contemplated herein exhibit adsorptive properties that are unique among known adsorbents. The common adsorbents, like charcoal and silica gel, show adsorption selectivites based primarily on the boiling point or critical temperature of the adsorbate. Activated zeolite X on the other hand, exhibits a selectivity based on the size and shape of the adsorbate molecule. Among these adsorbate molecules whose size and shape are such as to permit adsorption by zeolite X, a very strong preference is exhibited toward those that are polar, polarizable, and unsaturated. Another property of zeolite X that contributes to its unique position among adsorbents is that of adsorbing large quantities of adsorbate at either very low pressures, at very low partial pressures, or at very low concentrations. One or a combination of one or more of these adsorption characteristics or others can make zeolite X useful for numerous gas or liquid separation processes where adsorbents are not now employed. The use of zeolite X permits more efficient and more economical operation of numerous processes not employing other adsorbents.

In tables which follow, the term "Weight percent adsorbed" refers to the percentage increase in the weight of the adsorbent. The adsorbent was activated by heating it at a reduced pressure to remove adsorbed materials. Throughout the specification the activation temperature for zeolite X was 350° C., and the pressure at which it was heated was less than about 0.1 millimeter of mercury absolute unless otherwise specified. Likewise, the pressure given for each adsorption is the pressure of the adsorbate under the adsorption conditions unless the contrary is specified.

A further important characteristic of zeolite X is its property of adsorbing large amounts of adsorbates at low adsorbate pressures, partial pressures, or concentrations. This property makes zeolite X useful in the removal of adsorbable impurities from gas and liquid mixtures, since it has a relatively high adsorption capacity even when the material being adsorbed from a mixture is present in very low concentrations. Efficient recovery of minor components of mixtures is also possible. High adsorption at low pressures on zeolite X are illustrated in Table I. The data were obtained at 25° C. except where otherwise indicated.

TABLE I

| Adsorbate | Adsorbent | Pressure, mm. Hg | Wt. Percent Adsorbed |
|---|---|---|---|
| n-$C_6H_{14}$ | $Na_2X$ | 0.18 | 4.8 |
|  | $Na_2X$ | 0.22 | 10.2 |
|  | $Na_2X$ | 20 | 19.2 |
|  | $MgX$ | 20 | 18.3 |
|  | $BaX$ | 20 | 15.8 |
|  | $MnX$ | 20 | 17.9 |
|  | $Li_2X$ | 20 | 19.2 |
|  | $Co_2X_3$ | 20 | 16.1 |
| n-$C_8H_{18}$ | $Na_2X$ | 2.3 | 20.8 |
|  | $Na_2X$ | 5.0 | 20.8 |
|  | $Na_2X$ | 2.3 (150° C.) | 14.2 |
|  | $Na_2X$ | 5.0 (150° C.) | 14.2 |
|  | $Na_2X$ | 11.0 | 30 |
| Benzene | $Na_2X$ | 45 | 25.0 |
|  | $Na_2X$ | 0.061 (150° C.) | 3.2 |
| Toluene | $Na_2X$ | 0.03 | 7.5 |
|  | $Na_2X$ | 0.05 | 13.0 |
|  | $Na_2X$ | 0.08 | 18.0 |
|  | $Na_2X$ | 0.10 | 19.7 |
|  | $Na_2X$ | 27 | 26.8 |
| m-xylene | $Na_2X$ | 7 | 24.4 |
|  | $Na_2X$ | 7 (150° C.) | 18.9 |
|  | $Na_2X$ | 2.5 (150° C.) | 18.7 |
|  | $Na_2X$ | 0.0042 (150° C.) | 1.5 |

These data show that the porous structure of sodium zeolite X will permit free access to benzene and toluene molecules, so that they are readily adsorbed. This adsorptive behaviour permits the separation of mixtures of benzene, toluene, m-xylene, etc. with molecules too large to permit entry into the pore structure.

The selectivity of zeolite X for toluene compared to normal hexane is also shown in the data of Table I.

One of the unique properties of zeolite X is its strong preference for polar, polarizable and unsaturated molecules, providing of course, that these molecules are of a size and shape which permits them to enter the pore system. This is in contrast to charcoal and silica gel which show a main preference based on the volatility of the adsorbate. The greater the degree of polarity, polarizability and unsaturation, the greater the affinity of zeolite X for the adsorbate.

The high degree of selectivity shown by zeolite X for polar, polarizable, and unsaturated molecules renders zeolite X most useful in the separation of polar from less polar or non-polar molecules, polarizable from less or nonpolarizable molecules, and unsaturated for less unsaturated or saturated molecules.

Zeolite X also shows a selectivity for adsorbates, provided they can enter the porous network of the zeolite, based on the boiling point of the adsorbates, as well as on their polarity, polarizability, or degree of unsaturation.

An advantage that may be taken of the high adsorption at low pressures is the operation of adsorption processes at higher temperatures than are normally used with common adsorbents. The adsorptive power of physical adsorbents usually decreases with increasing temperature, and therefore while the adsorption capacity of many adsorbents in a certain separation may be sufficient if operated at one temperature, the capacity may not be sufficient to make operation feasible at a higher temperature. With strongly adsorbing zeolite X, however, substantial capacity is retained at higher temperatures.

Zeolite X may be used as an adsorbent for the purposes indicated above in any suitable form. For example, a column of powdered crystalline material has given excellent results as has a pelleted form obtained by pressing into pellets a mixture of zeolite X and a suitable binding agent such as clay.

The present process for separating toluene from vapor mixtures thereof with n-hexane depends on interrelated properties of zeolite X with respect to the adsorbed phase. The first property is the selectivity of the internal surfaces of the crystal towards unsaturated compounds such as aromatic hydrocarbons as compared with $C_6$ to $C_8$ saturated aliphatic hydrocarbons. As previously discussed and illustrated by Table I, zeolite X is capable of adsorbing these constituents based on a consideration of the zeolite X pore size and critical molecular dimensions of the compounds. For example, the pores of zeolite X are sufficiently large and in fact do receive n-hexane and n-octane.

Based on these considerations, one skilled in the art would logically conclude that zeolite X would not possess any particular selectivity for aromatic hydrocarbons in preference to the other possible constituents of the present vapor mixture. Contrary to these expectations, it has been discovered that zeolite X possesses an extremely strong selectivity for aromatic hydrocarbons to the substantial exclusion of saturated aliphatic hydrocarbons. One reason for this selectivity is the highly unsaturated nature of the aromatic hydrocarbons.

A second interrelated property is the relationship of the boiling point or vapor tension characteristics of an individual fluid or clearly related type of fluid to the capacity of the crystalline zeolite to adsorb the fluid at a given temperature and pressure. More specifically, it has been discovered that a relationship exists between the amount of fluid adsorbed and the temperature ratio $T_2/T_1$ where $T_1$ is the temperature, in degree Kelvin, at which the adsorption is carried out, assuming that the temperature of the fluid and the adsorbent are in equilibrium. $T_2$ is the temperature in degrees Kelvin at which the vapor pressure of the fluid is equal to the partial pressure or vapor tension of the fluid in equilibrium with the zeolite adsorbent. Stated in another way, $T_2$ is the temperature at which the vapor pressure of the adsorbate is equal to the partial pressure of the adsorbate during adsorption. $T_2$ is actually the dew point determined at the adsorption conditions.

Figure 2:
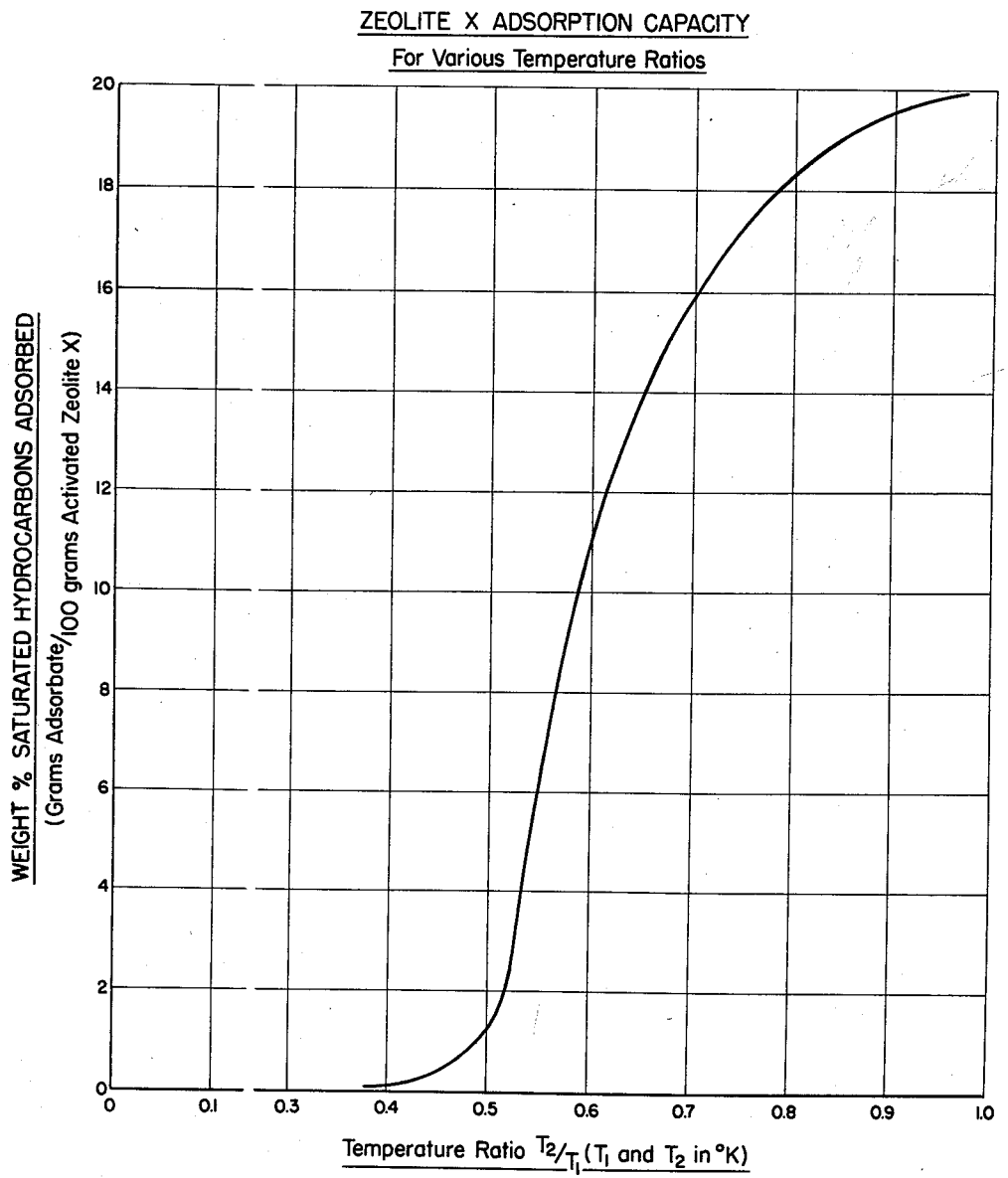
FIGURE 2 is a graph showing the amount of $C_6$ to $C_8$ saturated aliphatic hydrocarbon adsorbed versus the temperature ratio $T_2/T_1$ for zeolite X.

This relationship is clearly shown in the drawings. FIGURE 1 is a plot of the weight percent of aromatic hydrocarbons adsorbed versus the temperature ratio $T_2/T_1$ for zeolite X. Table II is a summary of a portion of the data from which these figures are prepared. FIGURE 2 is a plot of weight percent of $C_6$ to $C_8$ saturated aliphatic hydrocarbon adsorbed versus the temperature ratio $T_2/T_1$ for zeolite X. The $T_2$ values were read from the vapor pressure tables in "Industrial and Engineering Chemistry," vol. 39, page 517, April 1947.

TABLE II

| Adsorbate | Pressure, mm. Hg | Weight Percent Adsorbed | Temperature, ° K. | | |
|---|---|---|---|---|---|
| | | | $T_1$ | $T_2$ | $T_2/T_1$ |
| n-$C_6H_{14}$ | 0.18 | 4.8 | 298 | 202 | 0.68 |
| | 0.22 | 10.2 | 298 | 204 | 0.69 |
| | 20 | 19.2 | 298 | 259 | 0.87 |
| n-$C_8H_{18}$ | 11.0 | 30 | 298 | 294 | 0.99 |
| | 2.3 | 20.8 | 298 | 277 | 0.93 |
| | 5.0 | 20.8 | 298 | 280 | 0.94 |
| | 2.3 | 14.2 | 423 | 277 | 0.66 |
| | 5.0 | 14.2 | 423 | 280 | 0.66 |
| Benzene | 45.0 | 25 | 298 | 283 | 0.95 |
| | 0.061 | 3.2 | 423 | 207 | 0.49 |
| Toluene | 0.03 | 7.5 | 298 | 208 | 0.70 |
| | 0.08 | 18 | 298 | 217 | 0.73 |
| | 27 | 26.8 | 298 | 296 | 0.99 |
| | 0.05 | 13.0 | 298 | 212 | 0.71 |
| | 0.10 | 19.7 | 298 | 220 | 0.74 |
| m-xylene | 7 | 24.4 | 298 | 295 | 0.98 |
| | 7 | 18.9 | 423 | 295 | 0.70 |
| | 2.5 | 18.7 | 423 | 279 | 0.66 |
| | 0.0042 | 1.5 | 423 | 187 | 0.40 |

It was unexpectedly discovered that the saturated aliphatic hydrocarbons all exhibit the same temperature ratio $T_2/T_1$ relationship to weight percent of hydrocarbon adsorbed. That is, for a given $T_2/T_1$ value, the weight percent of hydrocarbon adsorbed will be the same for all of the previously defined hydrocarbons. A similar surprising relationship was found for the aromatic hydrocarbons. The present invention utilizes these relationships to provide a novel separation process.

The present invention combines the previously discussed properties of zeolite X in such a manner that a novel process is provided for separating toluene from a vapor mixture thereof with n-hexane. In its broadest form, the process consists of contacting the vapor mixture with a bed of at least partially dehydrated crystalline zeolite X adsorbent material. The toluene depleted mixture is then discharged from the crystalline zeolite X bed. Such contact is preferably effected under conditions such that the temperature ratio $T_2/T_1$ with respect to the inlet end of the bed and with respect to toluene is between 0.60 and 1.0, where $T_1$ is the adsorption temperature and is less than 973° K., and $T_2$ is the temperature at which toluene has a vapor pressure equal to its partial pressure in the vapor mixture. The lower limit of 0.60 for the temperature ratio $T_2/T_1$ is fixed by the discovery that below this value there is a smaller percentage change in adsorption capacity per unit change in the temperature ratio. In contrast, above 0.60 there is a larger percentage change in adsorption capacity per unit change in the temperature ratio. Stated in another way, if it is desired to obtain a certain incremental adsorbate loading at a specified adsorption temperature with a given feed stream, it would be necessary to increase the pressure of operation by a greater percent if the temperature ratio is below 0.60 than if it is maintained above this value in accordance with the invention. Also, the temperature ratio of 0.60 corresponds to a bed loading of 3 weight percent adsorbate and if the temperature ratio were reduced below this value, a larger adsorption bed would be required with its attendant higher investment and operating expenses.

The upper limit of 1.0 for the temperature ratio should not be exceeded because, if the adsorption temperature is equal to or less than the dew point, condensation of the n-hexane will occur, thereby essentially eliminating the sieving action of the zeolite X adsorbent. The broad upper limit of 973° K. for $T_1$ is due to the fact that above this temperature, the crystal structure of zeolite X will be disrupted or damaged with consequent loss of adsorption capacity and reduction in pore size, thereby fundamentally changing its adsorptive characteristics.

The present process is most efficiently performed if $T_1$, the adsorption temperature is less than 644° K. but higher than 233° K. This is for the reason that above such range, the hydrocarbons in contact with zeolite A will tend to isomerize, crack, aromatize and polymerize, all of which will clog the pores and cause loss of capacity of zeolite A molecular sieves. Below 233° K. relatively economical refrigerants such as Freon–12 cannot be employed, thereby necessitating more expensive refrigerating systems. Also, the mechanical stress of metals increases rapidly below about 233° K. so that special construction materials must be employed for adsorbers operating in this low temperature range. The increase in zeolite X adsorptive capacity for toluene at reduced temperatures justifies the employment of refrigeration down to the 233° K. level. Furthermore for maximum efficiency, $T_2$ is preferably below 630° K. This is to more effectively utilize the adsorptive capacity of zeolite X.

The present invention also contemplates a process for continuously separating toluene from a vapor mixture thereof with n-hexane. This continuous process includes two steps, an adsorption stroke and a regeneration stroke. The adsorption stroke is the same as the previously described adsorption where the temperature ratio $T_2/T_1$ is between 0.60 and 1.0, and the broad range for $T_1$ is less than 973° K. In the regeneration stroke, at least part of the adsorbed toluene is removed by subjecting the zeolite X adsorbent to conditions such that the temperature ratio $T_2/T_1$ at the end of the regeneration stroke with respect to at least one of the adsorbed aromatic hydrocarbons is less than the temperature ratio at the end of the adsorption stroke. Also, the difference in total adsorbate loading between the ends of the adsorption and regeneration strokes is at least one weight percent for increased efficiency of the overall continuous process. A lower differential adsorbate loading would entail prohibitively large adsorber units. During the regeneration stroke, $T_1$ is the regeneration temperature and is less than 973° K. for the broad range, and $T_2$ is the temperature at which the previously mentioned adsorbed toluene has a vapor pressure equal to the partial pressure of the hydrocarbon over the zeolite X bed at the end of the regeneration. It will be understood by those skilled in the art that at least two absorbent beds may be provided, with one bed on adsorption stroke and the other bed on regeneration stroke. The respective flows are then periodically switchd when the first bed becomes loaded with the adsorbate, so that the latter is placed on regeneration stroke and the second bed is placed onstream.

The continuous process is most efficiently performed if $T_1$, the adsorption temperature, is less than 644° K. but higher than 233° K. for previously stated reasons. Also, for maximum efficiency during the adsorption stroke, $T_2$ is below 630° K. During the regeneration stroke, $T_1$ is preferably below 644° K. and above 233° K., also for the previously discussed reasons.

It will be understood by those skilled in the art that the temperature ratio may be adjusted by well-known methods, as for example, heating the bed by direct or indirect heat transfer, employing a purge gas, or by drawing a vacuum on the bed during the regeneration stroke. Also, during the regeneration stroke the ratio may be adjusted for favorable operation by varying either or both the temperature and the pressure.

The many advantages of the invention are illustrated by Examples I and II. Although Example I relates to benzene adsorption, the performance of a toluene adsorption system would be determined in an analogous manner. Also, a toluene-normal hexane system would perform similarly to the xylene-heptane system of Example II.

Example I

A vapor mixture containing 0.5 mole fraction each of benzene and n-hexane at a total pressure of one atmosphere is to be contacted with a bed of zeolite X at a temperature of 172° C. Furthermore, the zeolite X bed is to be regenerated to effect continuous operation. The potential capacity of the bed to adsorb benzene from the stream at the bed inlet section may be determined as follows: $T_1$ is 445° K., and since the partial pressure of benzene is 7.35 p.s.i.a., $T_2$ will be 333° K. as read from the previously referenced vapor pressure table. Accordingly, $T_2/T_1$ will be 333/345 or 0.75. This temperature ratio will provide a loading of 20 weight percent of benzene on the zeolite X adsorbent as determined by a reading of the plot of FIGURE 1.

The potential capacity of the adsorbent bed inlet end for n-hexane may be determined in a similar manner. $T_2$ is 322, $T_2/T_1$ is 322/445 or 0.72 and the loading of n-hexane from the FIGURE 2 graph is 16.5 weight percent.

If an effluent completely free from benzene is desired the adsorption process should be stopped when benzene is detected in the effluent stream. During the regeneration stroke the bed temperature is adjusted to 203° C. (476° K.) while simultaneously adjusting the pressure to 1 p.s.i.a. while drawing a vacuum on the system. Under these conditions, $T_2$ will be 286° K., $T_2/T_1$ will be 286/476 to 0.60 and the residual loading will be reduced to about 3 weight percent.

Example II

A vapor stream having a mole fraction of 0.3 m-xylene and 0.7 n-heptane at a total pressure of two atmospheres is contacted with a bed of sodium zeolite X at a temperature of 177° C. (450° K.). Furthermore, the zeolite X bed is to be regenerated to effect continuous operation.

The potential capacity of the bed to adsorb m-xylene at the bed inlet section may be determined as follows: The partial pressure of m-xylene is 8.84 p.s.i.a. so that $T_2$ is 394° K., as read from the previously referenced vapor pressure table. Accordingly, $T_2/T_1$ is 394/450 or 0.88. This temperature ratio will provide a loading of 24.6 weight percent of m-xylene on zeolite X as determined by a reading of the FIGURE 1 graph.

The potential capacity of the adsorbent bed inlet for n-heptane may be determined in a similar manner. $T_2$ is 383° K., $T_2/T_1$ is 383/450 or 0.85 and the loading is 19 weight percent as determined from the FIGURE 2 graph. If it is desired to produce an effluent substantially free from m-xylene the adsorption process should be stopped when the first traces of m-xylene appear in the effluent.

During the regeneration stroke the bed temperature is raised to 282° C. (555° K.) while simultaneously reducing the pressure to 1 p.s.i.a. The $T_2$ value for m-xylene under these condtions is 334° K., $T_2/T_1$ is 334/555 or 0.60 and the residual loading of m-xylene will be reduced to about 3 weight percent.

Although the preferred embodiments have been described in detail, it is contemplated that modifications of the process may be made and that some features may be employed without others, all within the spirit and scope of the invention as set forth herein.

What is claimed is:

1. A process for separating toluene from a vapor mixture thereof with normal hexane which comprises contacting said vapor mixture with a bed of at least partially dehydrated crystalline zeolite X adsorbent material whose pores are sufficiently large to adsorb toluene and normal hexane and thereafter discharging the toluene depleted vapor stream from said bed.

2. A process in accordance with claim 1 wherein said adsorbent material is sodium zeolite X.

References Cited in the file of this patent

UNITED STATES PATENTS

| | | |
|---|---|---|
| 2,425,535 | Hibshman | Aug. 12, 1947 |
| 2,442,191 | Black | May 25, 1948 |
| 2,882,244 | Milton | Apr. 14, 1959 |
| 2,944,092 | Feldbauer et al. | July 5, 1960 |
| 2,950,336 | Kimberlin et al. | Aug. 23, 1960 |
| 2,988,503 | Milton et al. | June 13, 1961 |